United States Patent [19]

Idzik et al.

[11] 4,455,746

[45] Jun. 26, 1984

[54] TUBE CUTTER

[75] Inventors: Joseph J. Idzik; Charles H. Kouse; James L. Herzog, all of Springfield, Ohio

[73] Assignee: Elliott Turbomachinery Company, Inc., Jeannette, Pa.

[21] Appl. No.: 418,864

[22] Filed: Sep. 16, 1982

[51] Int. Cl.³ .............................................. B23D 21/14
[52] U.S. Cl. .................................................... 30/106
[58] Field of Search ..................... 29/282; 30/103, 105, 30/106, 108, 107

[56] References Cited

U.S. PATENT DOCUMENTS

| | | | |
|---|---|---|---|
| 669,983 | 3/1901 | Ewest | 30/108 |
| 747,320 | 12/1903 | Fitch | 30/106 |
| 791,784 | 6/1905 | Hendrickson | 30/106 |
| 2,262,041 | 11/1941 | Pennella | 30/106 |

FOREIGN PATENT DOCUMENTS 5198 of 1887 United Kingdom .................. 30/106

*Primary Examiner*—Jimmy C. Peters
*Attorney, Agent, or Firm*—Robert P. Hayter

[57] ABSTRACT

The cutter blade and mandrel of a tube cutter coact through sloped surfaces having a tongue-and-groove connection. Relative axial movement between the mandrel and cutter blade causes the cutter blade to move radially inward or outward and the tongue-and-groove connection permits the mandrel and cutter blade to rotate as a unit to thereby increase the effective cutter height of the blade by the height of the underlying mandrel.

4 Claims, 4 Drawing Figures

TUBE CUTTER

BACKGROUND OF THE INVENTION

In many heat exchanger installations such as tube-in shell heat exchangers and boilers employing tubes therein, it is often necessary to remove tubes from the tube sheets in which they are mounted so that they can be replaced. This may be necessary for many reasons such as leaks in the tubes or excessive scale formation therein. In the assembly of the heat exchangers, it is standard practice to feed the tubes through one tube sheet and into the opposite one. The tubes are then expanded at each end into engagement with the tube sheets and are securely held therein by the hoop stresses created by the expanding process. If the tubes are too long, excess material may be removed in a tube facing operation.

Many devices are available for quickly pulling a defective tube outwardly through the tube sheet of a heat exchanger. Prior to the extraction of the tube, it is necessary to detach the opposite end of the tube from the tube sheet at the opposite end of the heat exchanger. The two segments of the tube may then be removed from the respective tube sheets by conventional methods.

SUMMARY OF THE INVENTION

The location of a cutter blade interior of a tube sheet is controlled by adjustably locating a thrust assembly and, similarly, the location of the blade exterior of a tube sheet is controlled by adjustably locating a tube facing assembly collar. The cutter blade is radially positioned by axially moving a mandrel which coacts with the blade in an inclined tongue-and-groove relationship. The blade and mandrel are located in a tubular body, all of which rotate as a unit driven by an air motor or some other suitable driving device.

It is an object of this invention to provide a tube cutter having a more rigid support for the cutting blade.

It is a further object of this invention to provide a tube cutter which is adaptable for tube end facing.

It is an additional object of this invention to provide a tube cutter in which the cutter body assembly rotates as a unit. These objects, and others as will become apparent hereinafter, are accomplished by the present invention.

Basically, the present invention employs a wedge formed on a mandrel to move the cutting blade radially outward while the unit is rotating. Retracting the mandrel returns the cutting blade to its original position. A leaf spring retains the blade against the wedge surface of the mandrel in a tongue-and-groove relationship. A thrust assembly or tube facing collar is adjustably located on the unit to control the location of the cutting action.

BRIEF DESCRIPTION OF THE DRAWINGS

For a fuller understanding of the present invention, reference should now be made to the following detailed description therof taken in conjunction with the accompanying drawings wherein.

DESCRIPTION OF THE PREFERRED EMBODIMENT

Figure 1:
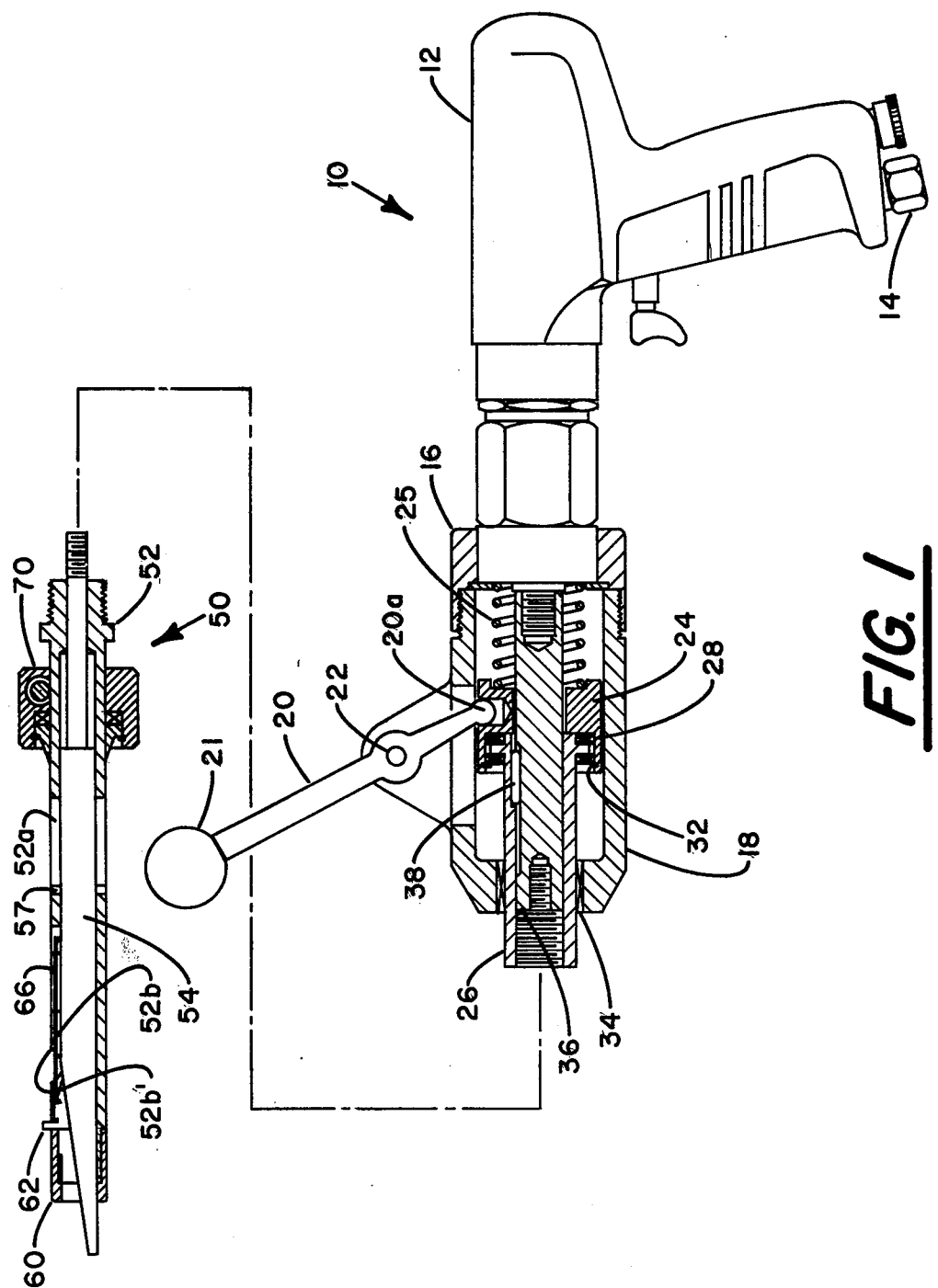
FIG. 1 is a partially sectioned assembly drawing of the present invention.

As best shown in FIG. 1, the air-driven tube cutter of the present invention is made up of a drive assembly 10 and a cutter body assembly 50. The drive assembly 10 includes an air motor or power feed unit 12 which is adapted to be connected to an air source (not illustrated) via connector 14. Air motor 12 is threadably connected to the body 18 of the feed lever assembly through motor coupling 16. Feed lever or handle 20 is pivotably secured to body 18 by dowel pin 22. Handle 20 has a knob 21 at one end and the opposite end, 20a, is pivotably received in bearing housing 24. Bearing housing 24 is biased by spring 25 and is attached to cage shank 26 via thrust bearing 28 and snap ring 32 and is supported in body 18 by needle bearings 34. Driver 36 is coupled to cage shank 26 by roller 38 which acts as a drive key. Driver 36 is operatively connected to the air motor 12 and is driven thereby. Because of the threaded connection between body 18 and motor coupling 16 the handle can be positioned at any radial position with respect to the axis of the air motor 12 and driver 36. Rotation of handle 20 causes relative axial movement between the bearing housing 24 and cage shank 36, which move axially as a unit, and the body 18 and driver 36 which do not move axially with respect to the air motor 12.

Figure 2:
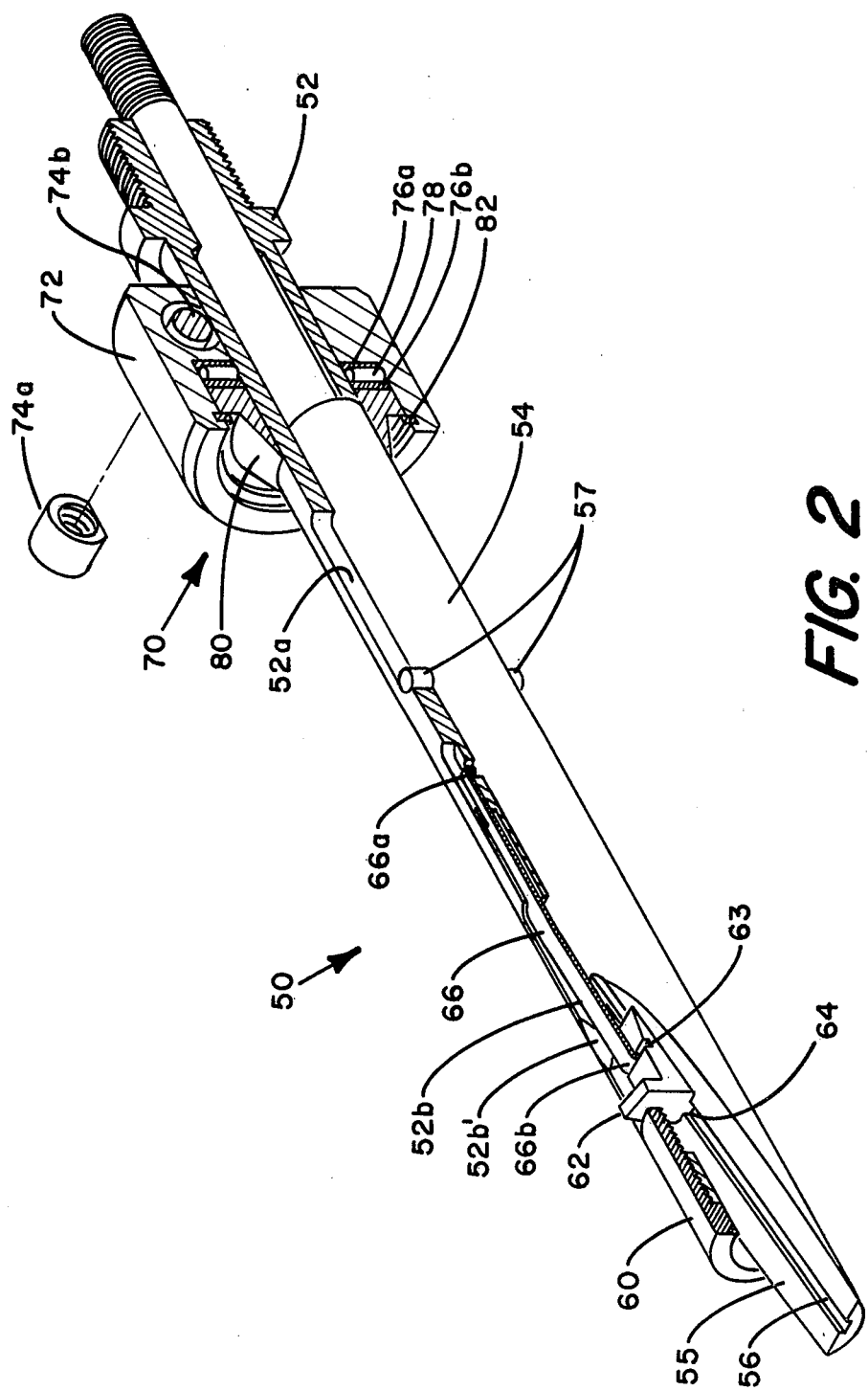
FIG. 2 is a partially sectioned isometric view of the cutter body assembly.

The cutter body assembly 50 includes cage 52 having slots 52a and b formed therein, mandrel 54 having dowel pin 57 therein, pilot 60, cutter blade 62 and cutter spring 66. Additionally, when configured as a tube cutter, thrust assembly 70 is adjustably positioned on cage 52. As best shown in FIG. 2, the thrust assembly 70 includes case 72, a clamp assembly made up of nut 74a and bolt 74b, thrust races 76a and 76b, bearing 78, thrust plate 80 and retaining ring 82. Cutter blade 62 has a tongue 64 which is received in groove 56 in the sloped surface 55 of mandrel 54. Spring 66 has a first end 66a secured in place in slot 52b and a second end 66b received in slot 63 of cutter blade 62. Dowel pin 57 is slidably received in slot 52a so as to permit relative axial movement between cage 52 and mandrel 54 while causing them to rotate together as a unit. Mandrel 54 is threadably secured to driver 36 and is driven thereby. Cage 52 is threadably secured to cage shank 26 and, because of dowel pin 57, mandrel 54, cage 52, driver 36 and cage shank 26 rotate together as a unit.

In operation, the thrust assembly 70 is secured in place on cage 52 by tightening the bolt 74b of the clamp assembly. The position of thrust assembly 70 is chosen such that when thrust plate 80 of the thrust assembly is forced into the swaged end of the tube (not illustrated) to be cut, the cutter blade 62 is at the desired axial position for cutting the tube. As noted above, relative axial movement is possible between a first unit defined by threadably coupled driver 36 and mandrel 54 and a second unit defined by threadably coupled cage shank 26 and cage 52 with the coaction of dowel pin 57 and slot 52a defining the limits of motion which is produced by movement of handle or feed lever 20. Thrust plate 80 engages the tube to be cut to properly locate the cutter blade 62 which is held in place, axially, by spring 66.

Figure 3:
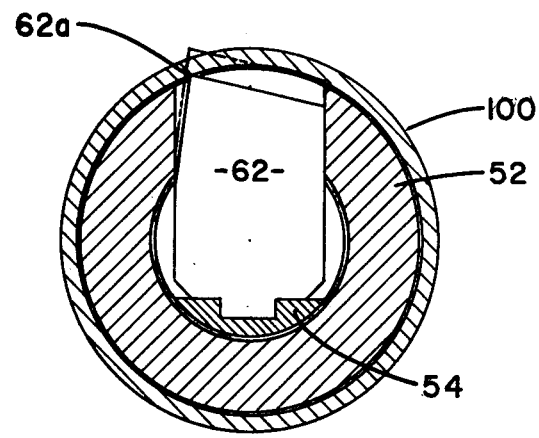
FIG. 3 is a sectional view taken through the cutter body assembly in one extreme position in the cutting mode.

The cage 52 and the cage shank 26 remain axially fixed while the air motor 12, driver 36 and mandrel 52 are axially moved through the rotation of handle 20. Cage shank 26 is rotatably supported relative to bearing housing 24 by thrust bearing 28. With thrust plate 80 held in engagement with the tube to be cut and driver 36, mandrel 54, cage 52 and cage shank 26 rotating as a unit, rotation of handle 20 in a clockwise direction produces relative motion between mandrel 54 and cage 52. Since cage 52 is held fixed by virtue of thrust plate 80 being held in engagement with the tube to be cut, the resultant relative motion of the mandrel 54 is such that the mandrel 54 advances further into the tube sheet (not illustrated). Because of the sloped surface 55 of mandrel 54, the advancing mandrel 54 acting upon the cutter blade 62 through the coaction of tongue 64 and groove 56 causes the rotating cutter blade to move radially outward as handle 20 is rotated. Referring now to FIG. 3, it is seen that the cutting engagement of point 62a of cutter blade 62 with the tube 100 is accompanied with an essentially diametrical engagement of the mandrel 54 with the inside wall of tube 100. Although the mandrel 54 is rotating about its axis, the sliding contact of the cage 52 with the tube 100 in the cutting mode increases the effecting cutting height of the cutter to that of the inside diameter of the tube 100. Also, the tongue-and-groove relationship of tongue 64 and groove 56 provide the necessary rigidity for the increased effective height. The cutter blade 62 is readily replaced by unthreading pilot 60 from cage 52, positioning cutter blade 62 for maximum cut, the FIG. 1 position, and, using pry notch 52b', prying spring 66 out of cutter slot 63 which permits ready removal and replacement of the cutter blade 62.

Figure 4:
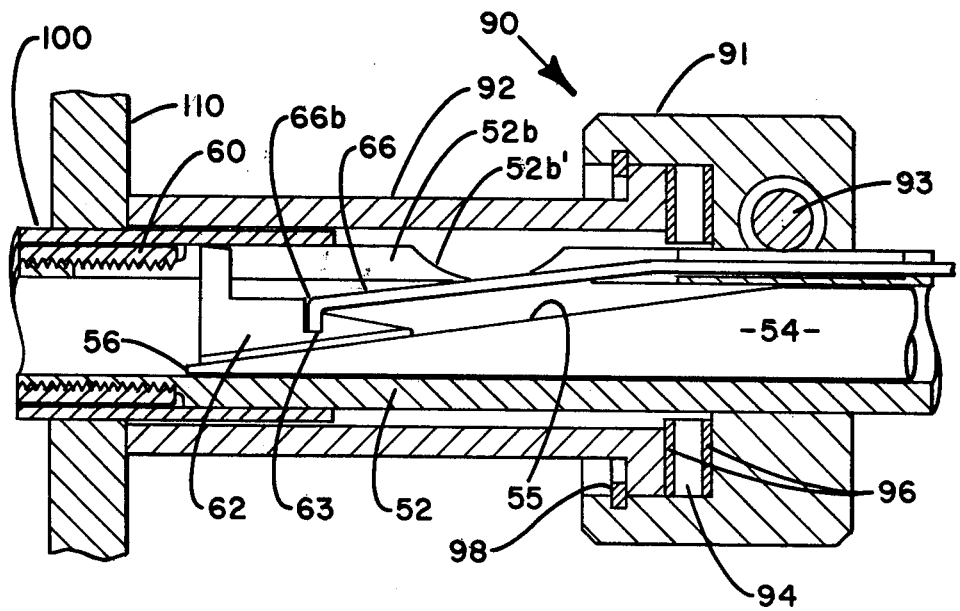
FIG. 4 is a partially sectioned view showing the tube facer collar assembly.

The thrust assembly 70 of the device of FIGS. 1 and 2 can be replaced by tube facer collar 90, as best shown in FIG. 4, with all other structure remaining the same. The tube facer collar 90 is used when the tube is to be cut flush with the tube sheet or exteriorly of the tube sheet whereas the thrust assembly 70 is used when the tube is to be cut interiorly of the tube sheet. The tube facer collar 90 is made up of case 91, collar 92, clamp assembly made up of a nut (not illustrated) and bolt 93, bearing 94, thrust races 96 and retaining ring 98. Although dimensionally different, the tube facer collar 90 is similar to thrust assembly 70 except that thrust plate 80 has been replaced with collar 92.

In operation, the tube facer collar 90 is secured in place on cage 52 by tightening bolt 93 of tube facer collar 90. The position of tube facer collar 90 is chosen such that when collar 92 is placed over the tube 100 and engages tube sheet 110, the cutter blade 62 is at the desired axial position for cutting the tube 100. Except for collar 92 being held in contact with tube sheet 110, instead of thrust plate 80 being held in contact with the swaged end of the tube, the cutting operation is as previously described.

Although a preferred embodiment of the present invention has been illustrated and described, other changes will occur to those skilled in the art. It is, therefore intended that the scope of the present invention is to be limited only by the scope of the appended claims.

What is claimed is:

1. A tube cutter comprising:
   a generally cylindrical cage means having a bore and a pair of axially spaced axially extending slots formed therein and of a diameter less than that of the internal diameter of a tube to be cut;
   a mandrel means slidably received in said bore and having a first end terminating in a sloped surface having a groove formed therein;
   dowel means diametrically extending from said mandrel means and extending into a first one of said slots and coacting therewith to limit the extent of relative axial movement between said cage means and said mandrel means and to cause said mandrel means and said cage means to rotate together as a unit;
   cutter blade means having a sloped surface and tongue complimentary to said sloped surface and groove of said mandrel means and extending at least partially into said second one of said slots from said bore;
   spring means engaged with said cage means and said cutter blade means to bias said sloped surface and tongue of said cutter blade means into contact with said sloped surface and groove of said mandrel means and to secure the cutter blade means from axial movement relative to the cage means without regard to the position of the mandrel means;
   positioning means adjustably located on said cage means for locating said cutter blade means with respect to the tube to be cut;
   means for producing relative reciprocating axial movement between said mandrel means and said cage means to thereby cause said cutter blade means to slide up and down said sloped surface of said mandrel means and to move radially inward and outward with respect to said second one of said slots; and
   driving means for rotating said mandrel means, said cutter blade means and said cage means as a unit.

2. The tube cutter of claim 1 wherein said positioning means is a thrust assembly including a thrust plate for engaging the swaged end of a tube to adjustably position said cutter blade means in the tube.

3. The tube cutter of claim 1 wherein said positioning means is a tube facer collar assembly including a collar coaxial with and radially spaced from said cage means to define an annular chamber for receiving the tube to be cut.

4. A tube cutter comprising:
   mandrel means having a sloped surface with a groove formed therein;
   cutter blade means having a sloped surface complementary to said sloped surface of said mandrel means and having a tongue formed on said sloped surface of said blade means and extending into said groove in a sliding relationship therewith;
   generally cylindrical cage means having a bore therein for receiving said mandrel means and at least a portion of said cutter blade means;
   means for causing relative reciprocating axial movement between said mandrel means and said cage means and cutter blade means to cause sliding movement between said sloped surfaces and between said tongue and groove whereby a portion of said cutter blade means is moved radially inward and outward with respect to said cage means;
   means for rotating said mandrel means whereby said cutter blade means rotates as a unit therewith to thereby increase the effective cutting height of said cutter blade means; and
   spring means engaged with said cage means and said cutter blade means to bias said sloped surface and tongue of said cutter blade means into contact with said sloped surface and groove of said mandrel means and to secure the cutter blade means from axial movement relative to the cage means without regard to the position of the mandrel means; and positioning means adjustably located on said cage means for locating said cutter blade means with respect to the tube to be cut.

* * * * *

UNITED STATES PATENT AND TRADEMARK OFFICE
CERTIFICATE OF CORRECTION

PATENT NO. : 4,455,746

DATED : June 26, 1984

INVENTOR(S) : Joseph J. Idzik, Charles H. Kouse, and James L. Herzog

It is certified that error appears in the above-identified patent and that said Letters Patent is hereby corrected as shown below:

Column 1, line 63: after "description" change "therof" to "thereof"

Column 2, line 30: after "shank" change "36" to "26"

Signed and Sealed this
Thirtieth Day of December, 1986

*Attest:*

DONALD J. QUIGG

*Attesting Officer*  *Commissioner of Patents and Trademarks*